J. ASHCROFT.
Steam Cooking Apparatus.
No. 225,317. Patented Mar. 9, 1880.
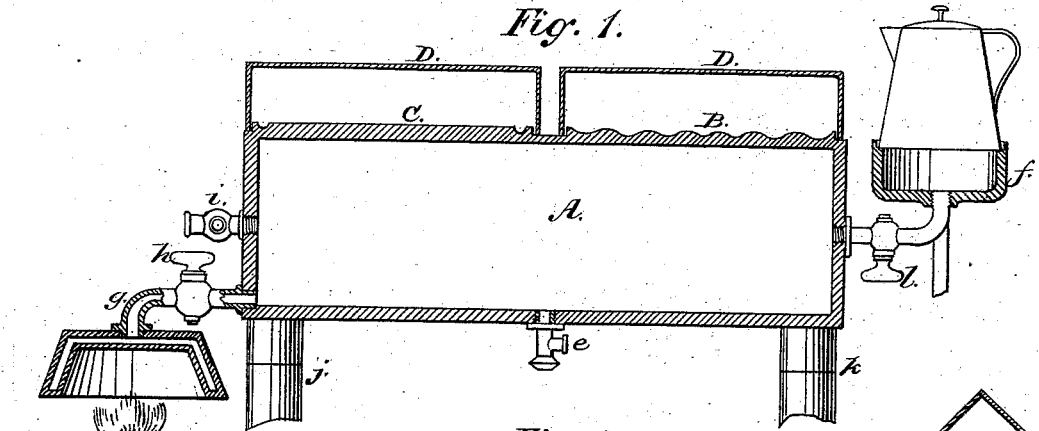
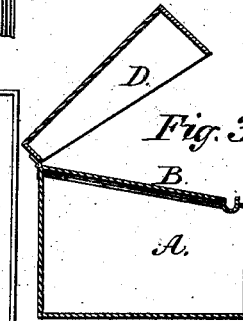
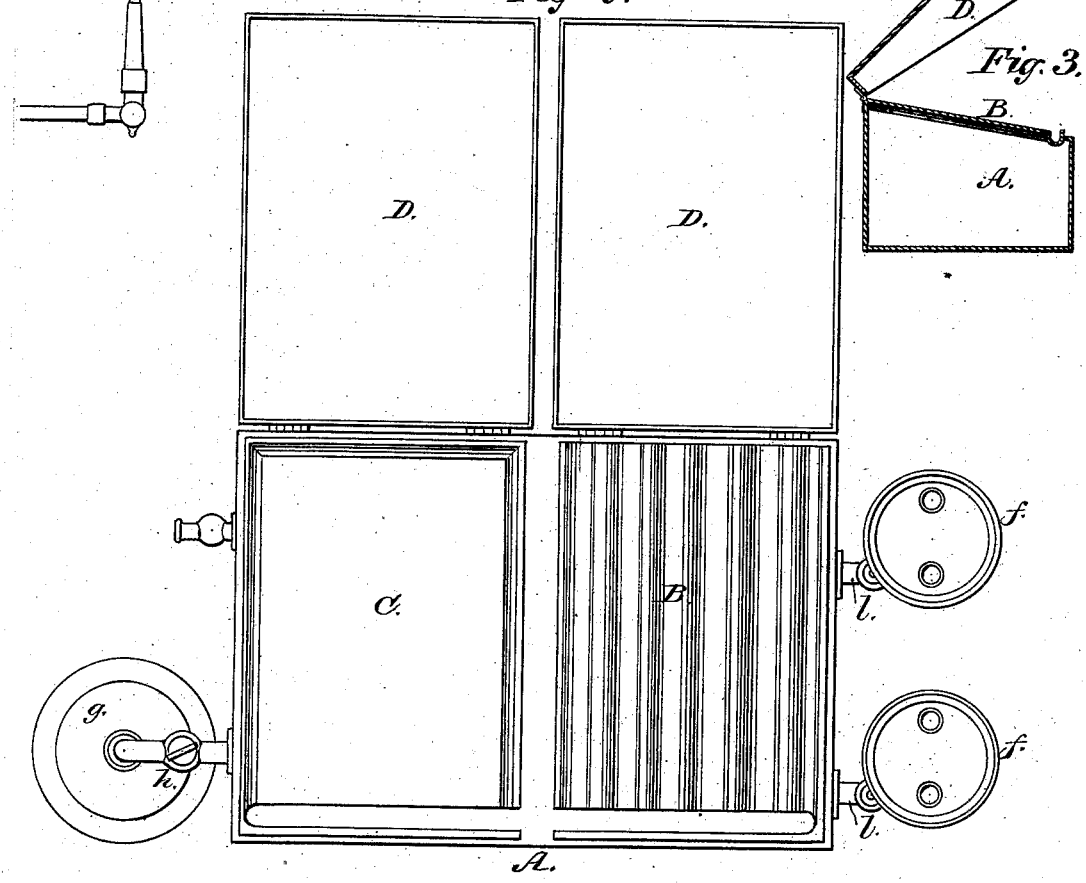
WITNESSES:
INVENTOR:
John Ashcroft

UNITED STATES PATENT OFFICE.

JOHN ASHCROFT, OF BROOKLYN, NEW YORK, ASSIGNOR TO SARAH J. ASHCROFT, OF SAME PLACE.

STEAM COOKING APPARATUS.

SPECIFICATION forming part of Letters Patent No. 225,317, dated March 9, 1880.

Application filed October 2, 1879.

*To all whom it may concern:*

Be it known that I, JOHN ASHCROFT, of the city of Brooklyn, in the county of Kings and State of New York, have invented certain new and useful Improvements in Steam Cooking Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification, wherein—

Figure 1 is a sectional view of the apparatus, and Fig. 2 a top view with the covers turned back. Fig. 3 is a transverse section of the apparatus, showing the top thereof inclined toward the receptacles for the drippings.

The object of my invention is to construct a steam broiling and frying apparatus, and, incidentally, to connect therewith boiling or baking receptacles.

The nature of my invention consists in the use of a steam-chamber the top of which is flat or slightly inclined, and smooth or corrugated, as frying or broiling is to be done, and in the details of construction by which the various processes are accomplished.

In the drawings, A represents a steam-chamber provided with an inlet for the admission of steam and an opening which is trapped for the escape of the condensed steam. In the drawings I have shown the top of this chamber arranged for both frying and broiling by dividing it in sections and making one flat and the other corrugated. This top is preferably slightly inclined toward one side, along which I have provided a depression to receive the drippings which flow from the meat. The direction of the incline and the form and position of the receptacle for drippings may be varied, as may be desired or found convenient. Preferably, also, I cover these cooking-surfaces with covers D D, which may be of any approved shape or character; but I believe I have shown the most convenient form to retain the radiated heat. These covers fit snugly over the cooking-surfaces, and I show them fitting into recesses provided to receive their edges, and I have also hinged them on one side for convenience of handling.

At convenient places in the chamber A, I also make other openings with steam-pipe connections, terminating in open chambers $ff$, so arranged that steam pots or boilers may rest thereon or fit thereinto, to be used for boiling or baking vegetable and other foods. These steam-pipe connections are also provided with suitable valves $l$. These chambers $ff$ are also provided with openings, through which the products of condensation are discharged, and these openings further act as a safety or relief device.

In operation, meats, eggs, vegetables, and other articles of food placed directly upon the cooking-surfaces B and C, without the intervention of any other receptacle, will be fried, and the necessary carbonization obtained to brown them properly, while by the corrugations of the surface B a result is obtained which substantially amounts to broiling, so far as the taste, juiciness, and appearance are concerned.

It is true that broiling, as generally understood, is the exposure of the article of food to the direct rays of heat from the fuel in process of combustion; but, as before stated, practically the same results are obtained by my apparatus, and without the possibility of burning or scorching.

If the open chambers $ff$ are to be used the valves $l$ are opened, and jacketed pots or boilers or bakers being placed thereon or fitted therein, the steam will circulate in the jackets and supply the heat to the boiling or baking receptacles. These open chambers $ff$ are provided with proper outlets at the bottom for the escape of the products of condensation, which act also as safety-valves.

I am aware that coiled steam-pipes have been used for frying and broiling; but I do not claim any such or kindred devices.

There is also shown in the drawings, at $g$ and $h$, a steam-generator and valved pipe connection, intended to be used to reconvert the condensed steam and to raise the temperature of the steam in the chamber A; but I make no claim to it here, as this feature will be made the subject of another application.

The arrangements shown for receiving and supporting steam-jacketed vessels will also be made the subject of another application, and are not herein claimed for that reason.

Having described my invention, what I claim to be new is—

1. A frying and broiling apparatus consisting of a steam-chamber with a flat top provided with suitable depressions to receive and collect the drippings of the meat being cooked, substantially as described.

2. A frying and broiling apparatus consisting of a steam-chamber with a flat top inclined so that the drippings will drain from the meat being cooked, substantially as described.

3. A broiling apparatus consisting of a steam-chamber with a flat top with a corrugated surface, substantially as described.

4. A cooking apparatus consisting of a steam-chamber with a flat top adapted for frying and broiling by means substantially as described, provided with a cover or covers, D D.

5. In combination with a steam cooking apparatus, an open chamber, $f$, arranged to support and receive steam-jacketed cooking utensils, and the valved connecting-pipe, substantially as described.

In testimony that I claim the foregoing I have hereunto set my hand this 2d day of October, 1879.

JOHN ASHCROFT.

Witnesses:
E. B. BARNUM,
G. W. BALLOCH.